United States Patent [19]

Hausdorf et al.

[11] Patent Number: 5,298,128

[45] Date of Patent: Mar. 29, 1994

[54] PROCESS FOR RECOVERING POLYURETHANE FROM POLYURETHANE WASTE PASTES

[75] Inventors: Jörg Hausdorf, Fürth; Bardo Anselm, Laudenbach; Steffen Kosack, Hassloch, all of Fed. Rep. of Germany

[73] Assignee: Firma Carl Freudenberg, Weinheim, Fed. Rep. of Germany

[21] Appl. No.: 865,898

[22] Filed: Apr. 9, 1992

[30] Foreign Application Priority Data

Apr. 24, 1991 [DE] Fed. Rep. of Germany ....... 4113282

[51] Int. Cl.$^5$ .............................................. B01D 3/38
[52] U.S. Cl. ........................................ 203/47; 203/92; 203/95; 203/DIG. 16; 524/591
[58] Field of Search ............ 203/47, 49, 96, 92, 203/95, DIG. 16; 524/591, 839; 528/60, 73; 34/10, 19; 210/770

[56] References Cited

U.S. PATENT DOCUMENTS

| | | | |
|---|---|---|---|
| 3,903,031 | 9/1975 | Matsuda et al. | 524/591 |
| 3,903,032 | 9/1975 | Matsuda et al. | 524/591 |
| 3,928,271 | 12/1975 | Matsuda et al. | 524/59.1 |
| 4,156,064 | 5/1979 | Falkenstein et al. | 156/315 |
| 4,401,713 | 8/1983 | Takata | 525/109 |
| 5,043,098 | 8/1991 | Padget et al. | 524/839 |
| 5,043,381 | 8/1991 | Coogan et al. | 524/591 |

FOREIGN PATENT DOCUMENTS

| | | | |
|---|---|---|---|
| 4113336 | 2/1992 | Fed. Rep. of Germany . | |
| 127493 | 9/1977 | German Democratic Rep. | C08G 2/36 |
| 141525 | 7/1980 | German Democratic Rep. | C08J 11/00 |

*Primary Examiner*—Virginia Manoharan
*Attorney, Agent, or Firm*—Kenyon & Kenyon

[57] ABSTRACT

Polyurethane can be reclaimed from solvent-containing or solvent-free polyurethane wastage by adjusting the amount of solvent, preferably with methyl ethyl ketone; adding an emulsifier, preferably, acylpolyethyleneglycolester; then adding about twelve times the wastage weight of water; mixing, preferably for about one hour at room temperature to form an emulsion; and then expelling the solvent as a two-phase distillate using steam; separating solvent from the resulting two-phase distillate; filtering off polyurethane granular material left floating in the water residue, and drying the separated granular material.

4 Claims, No Drawings

PROCESS FOR RECOVERING POLYURETHANE FROM POLYURETHANE WASTE PASTES

FIELD OF THE INVENTION

The invention pertains to recovery of polyurethane from solvent-free or solvent-containing polyurethane pastes which may have a lacquer-like consistency.

BACKGROUND OF THE INVENTION

Solvent-free polyurethane pastes are often used for manufacturing synthetics which find application as surface goods in the shoe and leather goods industries, for example, handbags, luggage, and upper materials for shoes.

Solvent-free polyurethane pastes are typically composed polyol and isocyanate prepoloymers and may also include fillers, pigments and flow-control agents.

Waste paste containing polyurethane is sometimes produced due to mistakes, for example, defective batches, and when processing equipment such as pumps and lines are cleaned with solvents, e.g., methyl-ethyl ketone, to remove residues. Thus, polyurethane waste pastes may be either solvent-free or contain solvent.

Plants typically process solvent containing polyurethane waste pastes by expelling solvent. Depending on the residual solvent content, the expelling processes may produce a highly viscous or heavily encrusted non-flowing residue which must be disposed of as special waste material. Special disposal requirements may also apply to many solvent-free waste pastes because they can rarely be used or reprocessed.

The possibilities for modifying or reprocessing polyurethane paste wastage to enable reuse or simplify disposal are limited.

OBJECTS AND SUMMARY OF THE INVENTION

An object of this invention is to recover the main constituents of polyurethane wastage, namely, the polyurethane and solvent, in a form that can be reused, and it is further object to so completely effect separation that any remaining material no longer requires special waste disposal procedures.

An advantage of the invention is that with simple chemical processes and efficient expenditure of chemicals and energy, it is possible to provide a disposal system for polyurethane wastage which is not harmful to the environment and which makes it possible for polyurethane waste materials to be reused, whether or not they originally contained solvent and had lacquer-like or pasty consistency.

The present invention provides a method for processing polyurethane waste pastes comprising the steps of: preparing a polyurethane wastage paste for emulsification by adjusting the amount of solvent therein; emulsifying adjusted polyurethane wastage by mixing with an emulsifying agent and water; contacting a steam carrier with the emulsion to remove solvent and form a water residue including a particulate polyurethane; and separating the particulate polyurethane from the water residue.

DETAILED DESCRIPTION OF THE INVENTION

Since the polyurethane wastage paste may be solvent-free or only contain a small amount of solvent, additional solvent, preferably methyl-ethyl ketone should be added before further processing in accordance with this invention. Most preferably, methyl-ethyl-ketone solvent is used to adjust the dry solids weight of the polyurethane in the waste paste to about 30%.

An emulsifier, preferably, acylpolyethyleneglycolester, is added to the solvent adjusted paste in an amount selected to control the particle size of the polyurethane product of the process, preferably, a weight ratio of 1 part emulsifier to 10 parts solvent. Such emulsifiers are commercially available and are typically used for producing emulsions of fatty acids, fatty oils, organic solvents and organic substances dissolved in them.

Water is then added in an amount sufficient to form an emulsion, preferably, about twelve times the quantity by weight of the solvent adjusted paste. The polyurethane waste paste, solvent, emulsifier and water are mixed at room temperature for a period sufficient to form the desired emulsion and to complete reaction of the polyurethane or prepolymers, preferably, about one hour.

The solvent may then be removed from the emulsion via a steam carrier, e.g., using known steam distillation methods. (See Kirk-Othmer, "Encyclopedia of Chemical Technology", Third Ed., Vol. 7, pp. 881–886, Wiley Interscience (1979). Such methods utilize a steam carrier to remove solvent from the water phase of the emulsion as a two-phase water/solvent distillate. The steam carrier enables high-boiling liquids, which are not, or are only slightly, miscible with water to be distilled at temperatures as low as 98° to 100° C. by adding the vapor pressure of the hot steam to the relatively low vapor pressure of the distilled liquid.

The two-phase water/solvent distillate that results includes solvent removed from the emulsion and water. These two phases are easily separated from one another by decanting or siphoning or other well known techniques. The resulting solvent may be so pure that it can immediately be used again. If necessary, the solvent can be dried by means of a granular drying agent such as calcium chloride or a molecular sieve.

The polyurethane in the water phase residue, resulting from steam distillation of the emulsion forms a particulate, usually fine-grained, polyurethane granular material, floating in the water. The particle size may be, at least in part, controlled by the concentration of the emulsifier. Smaller amounts of emulsifier yield a course-grained granular polyurethane particulate with solvent inclusions and amounts of emulsifier greater than about 1 part by weight emulsifier to about 10 parts by weight solvent adjusted paste may lead to a very fine-grained granular polyurethane particulate which can cause problems in subsequent filtering operations.

The present invention can produce a polyurethane particulate with a particle size of about 100 to 2000 micrometers. The particulate may be filtered off through an appropriate screen-belt filter or similar means and then dried, for example, in a screen-belt dryer or in a drying stove. The resulting filtrate can be disposed of as an ordinary plastic waste material or be utilized again as reclaimed polyurethane. The polyurethane particulate is useful for manufacturing dusting material for horseback riding halls, for drainage plates or the like.

Without the water/emulsifier additive and otherwise under the same conditions, a high viscosity or heavily encrusted polyurethane residue has been found to form due to a higher residual solvent residual content. Both the encrusted and highly viscous polyurethane residues are considered waste materials which require special handling for disposal.

What is claimed is:

1. A distillation process for recovering polyurethane from solvent-containing or solvent-free polyurethane waste pastes, comprising the steps of: adding a solvent to a waste paste to adjust the waste paste dry solids weight to about 30%, then adding an acylpolyethyleneglycolester emulsifier in a ration of 1 part by weight emulsifier to 10 parts solvent adjusted paste;

and subsequently mixing in twelve times the solvent adjusted paste weight of water;

mixing the resulting emulsion for one hour at room temperature;

then expelling the solvent from the emulsion using steam to liberate a two-phase water and solvent distillate from the emulsion; and filtering off a fine grained polyurethane granular material, floating in water phase; and drying the granular material.

2. The method of claim 1 wherein the polyurethane paste is prepared for emulsification by adding methyl ethyl ketone until the dry solids weight of the polyurethane in the prepared paste is about 30%.

3. The method of claim 2, wherein the granular polyurethane has a grain size of about 100 to 2000 micrometers.

4. The method of claim 1 wherein the polyurethane particulate has a particle size of about 100 to 2000 micrometers.

* * * * *